United States Patent [19]

Hinote

[11] 4,208,109
[45] Jun. 17, 1980

[54] SELECTIVE REAL ESTATE DISPLAY SYSTEMS

[76] Inventor: Gary L. Hinote, 1413 SE. 47th Ter., Cape Coral, Fla. 33904

[21] Appl. No.: 947,754

[22] Filed: Oct. 2, 1978

[51] Int. Cl.² .................... G03B 31/00; G03B 21/22
[52] U.S. Cl. .................................. 353/15; 353/74; 353/25
[58] Field of Search ................. 353/15, 18, 19, 74, 353/77, 78, 122, 121, 120, 119, 25–27

[56] References Cited

U.S. PATENT DOCUMENTS

| | | | |
|---|---|---|---|
| 2,734,420 | 2/1956 | Smith | 353/94 |
| 3,296,727 | 1/1967 | Liguori | 353/25 |
| 3,552,845 | 1/1971 | Yates | 353/74 |
| 3,961,839 | 6/1976 | Brobst | 350/117 |
| 4,027,958 | 6/1977 | Shigeta et al. | 353/15 |
| 4,041,457 | 8/1977 | Koch | 353/25 |

FOREIGN PATENT DOCUMENTS

| | | | |
|---|---|---|---|
| 610040 | 5/1926 | France | 353/78 |
| 2228261 | 11/1974 | France | 353/15 |
| 648936 | 1/1951 | United Kingdom | 353/77 |

Primary Examiner—Harry N. Haroian
Attorney, Agent, or Firm—Alfred E. Wilson

[57] ABSTRACT

A selective Real Estate Display System including an enclosure which may be provided within a real estate office or in a separate structure adjacent to a real estate office, a slide projector, in the enclosure, provided with a substantial number of slides comprised of a sequential arrangement of group of slides, the picture images on the slides of each group dealing with a particular real estate category such as three bedroom, two bath homes, etc. A rear projection screen mounted in a wall of the enclosure is directed toward a parking area for viewing by the occupants of a vehicle in the area, and a selector box on a post, positioned adjacent to the parking area, includes a plurality of push buttons, one for each category of real estate, for selective operation by a vehicle occupants while seated in the vehicle. A voice commentary from a multi-cartridge tapedeck is projected from a speaker atop the selector box. The tapedeck is of a commercially available type as are the electronic control devices operated by the push buttons for selecting the real estate categories on the slide projector along with corresponding tapes in the tapedeck, for starting each slide category and for advancing the slides in response to pulses on the tapes.

7 Claims, 5 Drawing Figures

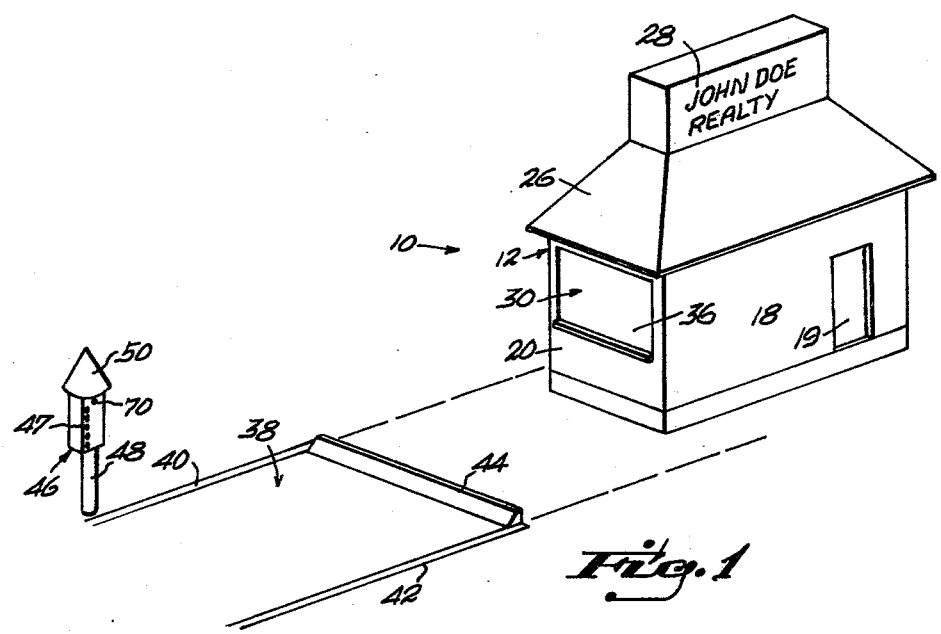
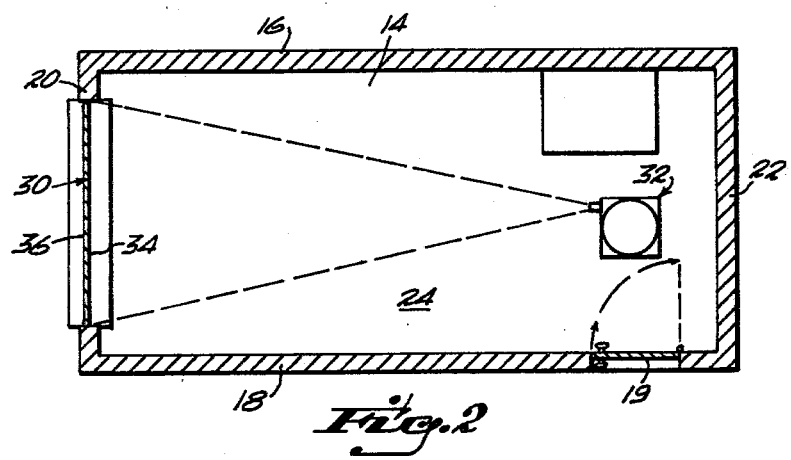
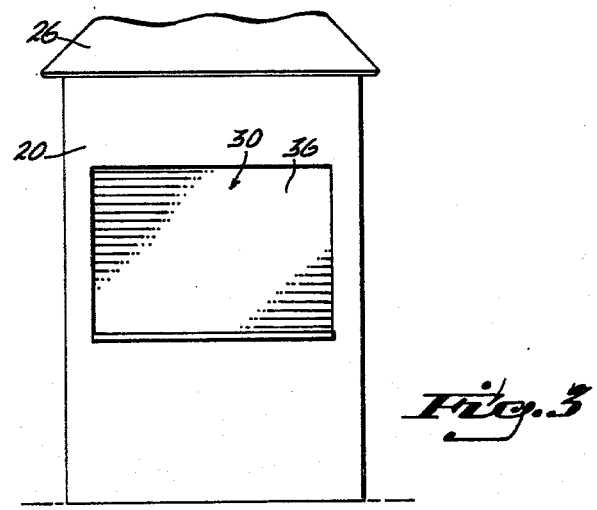

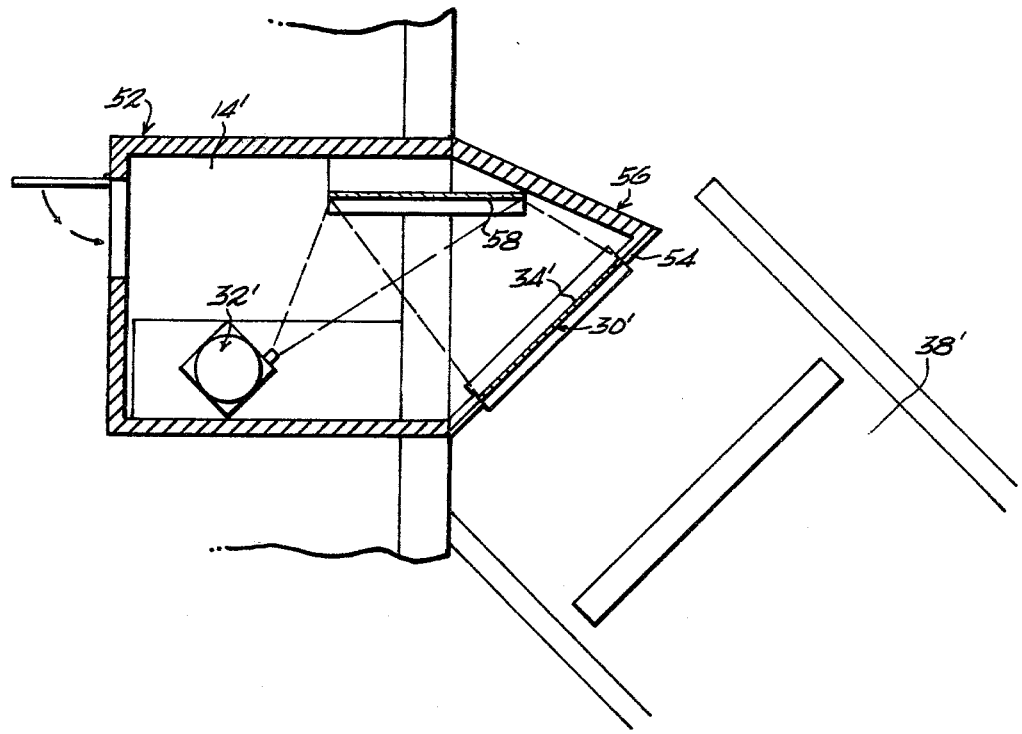
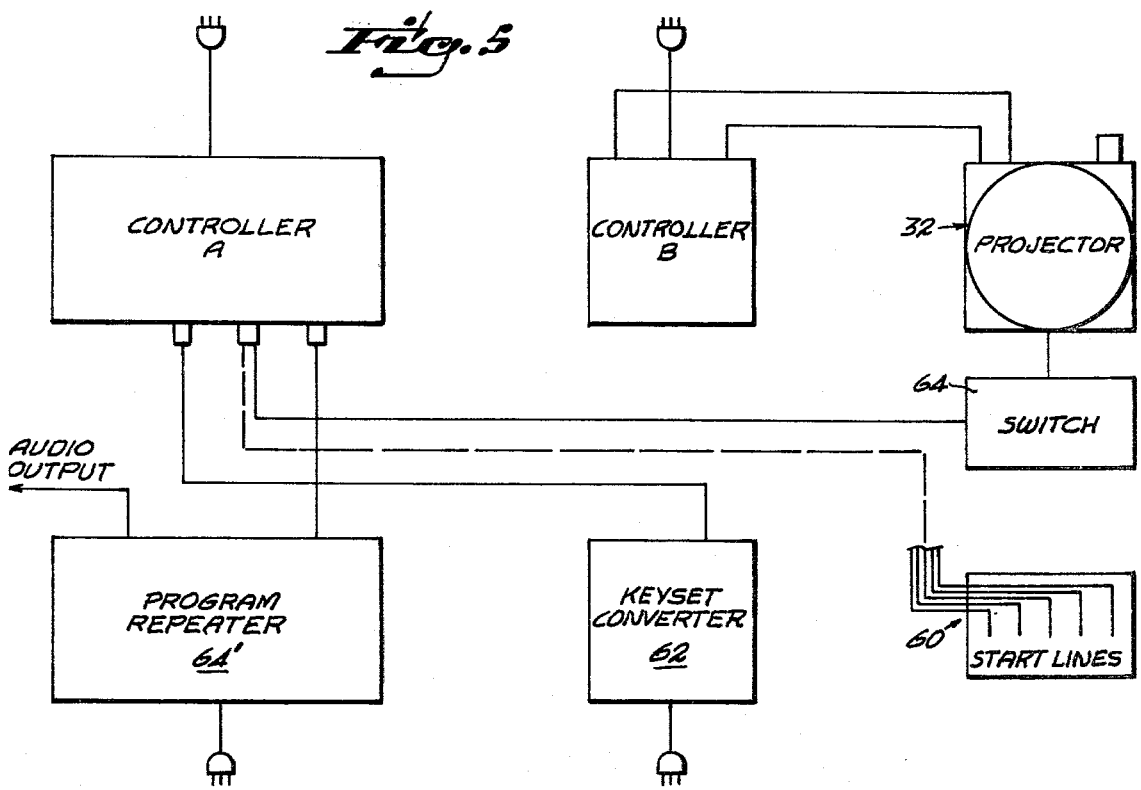

SELECTIVE REAL ESTATE DISPLAY SYSTEMS

BACKGROUND OF THE PRESENT INVENTION

The present invention pertains to a selective real estate display system which permits a person or persons in a vehicle to drive into a private parking area of a real estate office and to view a relatively wide range of real estate presentations in a selected category without leaving the vehicle or occupying a substantial amount of time of the real estate broker or salesman. When the field is narrowed down to something of interest, the occupants of the car may then enter the office to consult a salesman, or alternatively, another button may be provided on the selector box to operate a signal means such as a buzzer, bell, flasher light, etc. to a signal a sales person to come to the vehicle.

In the form of the invention provided by your Applicant, five real estate categories are included on the projector with a five cartridge tapedeck, controlled by five push buttons on the selector box. Sixteen slides, each with a different real estate presentation, comprises each category for a total of eighty presentations for potential real estate prospects. Each of the eighty presentations is accompanied by an oral commentary received from a speaker at the side of the vehicle. The number of categories and individual presentations in each category may be varied within the capabilities of available equipment.

Therefore, one of the principal objects of the present invention is to provide a selective real estate display system utilizing commercially available equipment, including a slide projector and multi-cartridge tapedeck which are disposed in an enclosure in or adjacent to a real estate office whereby a potential buyer may view a plurality of real estate presentations in a selected category by the simple actuation of a single push button of a plurality of push buttons carried in a control box, mounted adjacent to a vehicle parked in an outside parking area, located relative to a rear projection screen disposed in a wall of the enclosure.

Another object of the invention is to provide a loud speaker relative to the control box to permit the occupants of the vehicle to hear an oral commentary of each real estate presentation as it appears on the screen.

A further object of the invention is to provide a delineated parking area in a position relative to the screen to guide the driver of a vehicle into a proper position to operate the push button selectors and to view the projection screen.

BRIEF DESCRIPTION OF THE DRAWINGS

FIG. 1 is a perspective view of a typical enclosure, delineated parking area and push button selector box in accordance with the present invention;

FIG. 2 is a sectional plan view of the enclosure, particularly illustrating the position of the slide projector relative to a conventional rear projection screen for viewing from the outside by a person or persons in a vehicle, parked in the delineated parking area of FIG. 1;

FIG. 3 is a front elevational view of the enclosure of FIG. 1;

FIG. 4 is a sectional plan view of a modified form of the invention; and

FIG. 5 is a block diagram of the arrangement of the commercially available slide projector, multi-cartridge tapedeck, category selector and electronic control devices utilized in the present invention.

DETAILED DESCRIPTION OF A PREFERRED EMBODIMENT

With reference to the drawings in which like reference characters designate like or corresponding elements throughout the various views and with particular reference to FIGS. 1 and 2, the selective real estate display system of the present invention is indicated at 10 and includes a relatively small out-building 12 providing an inner chamber 14 delineated by opposed side walls 16, 18, with an access door 19, front and rear walls 20, 22, a floor 24 and a ceiling or roof 26 which may include an exterior sign 28 announcing the name of the Realty Company.

A conventional rear projection screen 30 is mounted in the front wall 20 and a commercially available multi-slide projector 32 is properly positioned in chamber 14 to project the picture images from the slides onto a rear face 34 of screen 30 to be viewed on the outside face 36 thereof.

A parking area 38 is delineated at 40, 42 in alignment with the outside face 36 to properly position a vehicle parked therein to permit a person or persons seated in the vehicle to view real estate presentations projected on the rear face 34, a front wheel chock 44 is anchored at the front of the parking area 38 at a predetermined distance from the front wall 20.

A real estate category selector box 46, including a plurality of selector buttons 47, is mounted atop a standard 48 positioned relative to the parking area 38 for ready access to a person seated in a vehicle, properly positioned in the parking area 38. Mounted atop the selector box 46 is a weather protected loud speaker 50. Appropriate indicia (not shown) is provided along side of the respective buttons to identify the categories.

FIG. 4 illustrates a modification of the invention wherein a general parallel parking area is available adjacent to the main building for example, of a real estate office, and in which the parking spaces are angularly disposed relative to a projector chamber 14' in the main building, defined by interior partition walls generally designated at 52. The rear projection screen 30' is mounted in a front wall 54 of an angular wall extension generally designated at 56. Extension 56 is properly angled to align the screen 30' relative to a parking area 38' which is provided with a selector box and speaker 46 and 50 (not shown) as in FIG. 1. In this instance the pictures from the slide projector 32' are reflected onto the rear face 34' of a screen 30' by a mirror 58 which is properly positioned in chamber 14'. It should be noted that the arrangement of FIGS. 1 and 2 can be employed relative to a projection chamber in a main building when the parking area such as 38' is at right angles to the exterior walls of the chamber.

FIG. 5 is a block diagram of a typical layout of commercially available electron devices utilized in combination with the projector 32 and will be hereinafter described relative to a five category system. Being of commercially available designs, the projector and other electronic devices are not individually claimed. The projector 32, for example only, is provided with sixteen slides for each of five real estate catagories. Switch 64 activates the slide projector when any one of the five buttons 47, connected respectively to the start lines 60, is actuated. The keyset convertor 62 determines the proper catagory sequence and the controller B receives a signal therefrom to position the projector at the beginning of the selected sequence of the selected group of slides and to start same. Controller A selects the proper audio tape in the program repeater 64 which comprises a five cartridge tapedeck. In this manner an oral commentary is transmitted to speaker 50. At the end of each commentary, a pulse, provided on the reverse side of the tape, signals the controller A to advance one slide of the selected group in the sequence in a conventional way.

In this manner a potential real estate purchaser may view any number of presentations from one to sixteen, in the example described, in any one or more of five groups of categories such as 3 bedroom 2 bath homes, apartment houses, condominiums, commercial properties, etc. When something of interest is viewed, the person may enter the adjacent office for a discussion with a salesman. A very substantial amount of time is saved by the salesman and the customer has the opportunity to privately select properties of interest in a minimum amount of time.

Alternatively, a sixth button 70 may be included on the selector box 46 to activate a signal such as a buzzer, bell, etc. in a conventional manner to signal a salesperson in the office to come out to the vehicle.

I claim:

1. A selective real estate display system utilizing a multi-slide projector provided with substantial number of slides comprised of a sequential arrangement of groups of slides, a start switch, a multi-cartridge tape deck providing one cartridge for each group of slides, a keyset converter for selecting an individual group of slides; and first and second controllers to position and start a selected group, to select a cartridge providing oral comments coordinated with the selected group, and to individually advance the slides of the group in unison with the coordinated commentaries on the tape cartridge, the display system comprising, an enclosed chamber formed by a pair of opposed side walls, front and back walls, a floor and a roof,
   a rear projection screen mounted in said front wall,
   a parking area longitudinally disposed in a confronting relation to an outer viewing side of said screen,
   a selector box including a plurality of push buttons, positioned for selective operation by a person in a vehicle parked in said parking area, each of the pluralities slides of each of the groups of slides provide picture images of a particular real estate category such as 3 bedroom, 2 bath houses; and the projector and multi-cartridge tapedeck are electronically connected to said push buttons in a manner whereby each group of slides is individually controlled by operation of one particular button for sequential projection of individual slide images of said group of slides onto a rear side of said screen for viewing on said outer side by the occupants of the vehicle with a coordinated commentary from a speaker operably connected to the multi-cartridge tapedeck in a conventional manner.

2. The real estate display system as defined in claim 1 wherein said enclosure is comprised of a unitary structure apart from any other structure.

3. The real estate display system as defined in claim 1 wherein said enclosure is defined within a larger structure such as the main office structure of a real estate business.

4. The real estate display system as defined in claim 2 wherein said projector, rear projection screen and parking area are disposed in an aligned relation.

5. The real estate display system as defined in claim 1 including a wheel chock fixed in said parking area a predetermined distance from said enclosure to limit the approach of a vehicle toward said enclosure.

6. The real estate display system as defined in claim 3 wherein said parking area is disposed in an angular relation to said main office structure and said screen is fixed in a front wall of said enclosure which is angled in a manner so as to position said screen in an aligned relation with said parking area.

7. The real estate display system as defined in claim 6 wherein the picture images on said slides are reflected onto said screen by a mirror positioned in a proper angular relation between the projector and screen.

* * * * *